United States Patent
Hommes et al.

(10) Patent No.: US 9,637,640 B2
(45) Date of Patent: May 2, 2017

(54) METHOD FOR COATING THE SURFACE OF INORGANIC PARTICLES, PARTICULARLY TITANIUM DIOXIDE PIGMENT PARTICLES

(71) Applicant: Kronos International, Inc., Leverkusen (DE)

(72) Inventors: Corinna Hommes, Köln (DE); Jörg Friedrich, Leichlingen (DE); Heiko Frahm, Leverkusen (DE); Uwe Wilkenhoner, Wuppertal (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 14/548,019

(22) Filed: Nov. 19, 2014

(65) Prior Publication Data
US 2015/0166794 A1 Jun. 18, 2015

(30) Foreign Application Priority Data
Dec. 17, 2013 (EP) .................................... 13005849

(51) Int. Cl.
*C09C 1/00* (2006.01)
*C09C 1/36* (2006.01)
(Continued)

(52) U.S. Cl.
CPC .......... *C09C 1/3661* (2013.01); *C09C 1/3615* (2013.01); *C09C 3/063* (2013.01); *C01P 2004/84* (2013.01); *C09C 3/04* (2013.01)

(58) Field of Classification Search
CPC ............................. C09C 1/3653; C09C 3/063
See application file for complete search history.

(56) References Cited

U.S. PATENT DOCUMENTS 2,885,366 A 5/1959 Iler
RE27,818 E 11/1973 Werner
(Continued)

FOREIGN PATENT DOCUMENTS

DE 102006059849 6/2008
EP 0130272 2/1984
(Continued)

*Primary Examiner* — Robert Vetere
(74) *Attorney, Agent, or Firm* — Locke Lord LLP

(57) ABSTRACT

The invention relates to a method for coating the surface of inorganic solid particles in an aqueous suspension. The untreated particles, particularly $TiO_2$ base material, are made into an aqueous suspension and subsequently disagglomerated. According to the invention, a disagglomerated suspension of untreated particles is fed (recirculated) from an intermediate vessel (vessel) in a cyclic process. The intermediate vessel contains a high-speed agitator preferably having a minimum peripheral speed of 15 m/s or a specific agitator capacity P/V of at least 30 W/m3. A pipeline mixer (e.g. inline disperser) based on the rotor/stator principle is furthermore installed in the circuit. The water-soluble precursor compounds of the coating substances, and equally any necessary pH-controlling substances, are metered into the pipeline mixer. This leads to surface coatings with greater smoothness (low specific surface area according to BET), improved density (low sulphuric-acid solubility), and less coating substance precipitated separately (improved gloss).

31 Claims, 4 Drawing Sheets

(51) Int. Cl.
  *C09C 3/06* (2006.01)
  *C09C 3/04* (2006.01)

(56) References Cited

U.S. PATENT DOCUMENTS

| | | | |
|---|---|---|---|
| 4,125,412 A * | 11/1978 | West | C09C 1/3661 |
| | | | 106/446 |
| 5,993,533 A | 11/1999 | Diebold et al. | |
| 6,156,826 A * | 12/2000 | Guenin | A61K 8/11 |
| | | | 524/47 |
| 6,695,906 B2 | 2/2004 | Hiew et al. | |
| 2006/0032402 A1* | 2/2006 | Drews-Nicolai | C09D 7/1225 |
| | | | 106/436 |
| 2008/0141905 A1 | 6/2008 | Juergens et al. | |
| 2009/0297852 A1* | 12/2009 | Frahm | C09C 1/3684 |
| | | | 428/403 |
| 2013/0057371 A1* | 3/2013 | Shimoyama | B22F 1/0062 |
| | | | 335/297 |

FOREIGN PATENT DOCUMENTS

| | | |
|---|---|---|
| GB | 1340045 | 12/1973 |
| WO | WO 2009146834 | 12/2009 |

\* cited by examiner

METHOD FOR COATING THE SURFACE OF INORGANIC PARTICLES, PARTICULARLY TITANIUM DIOXIDE PIGMENT PARTICLES

RELATED APPLICATIONS

This application claims the benefit of EP 13005849.8 filed Dec. 17, 2013.

BACKGROUND

Technical Field of the Invention

The invention relates to a method for coating the surface of inorganic solid particles in an aqueous suspension. It particularly relates to the coating of titanium dioxide pigment particles with silicon dioxide and aluminum oxide.

Description of Related Art

The surface of fine, inorganic solid particles is frequently coated in order to modify certain properties, such as abrasion resistance, surface charge, dispersing properties, acid or light resistance. For example, U.S. Pat. No. 2,886,366 describes the application of a dense silicon dioxide coating to such substrate particles as nickel or iron powder, glass fibers or titanium dioxide. Color and white pigments are regularly coated with various oxides and hydroxides (e.g. EP 0 130 272 A1, U.S. Re. 27818).

Surface treatment (post-treatment), particularly of $TiO_2$ pigments, is customarily performed in the aqueous phase, where metal oxides, hydroxides, phosphates or similar compounds are deposited on the particle surface. The method is customarily implemented in the form of a batch process in an agitated tank, as disclosed in GB 1 340 045, for example. Starting with an aqueous pigment particle suspension, corresponding metal salts are added in dissolved form as so-called precursor compounds. Alkaline or acid substances are then used to set the pH value of the suspension in such a way that the precursor compounds are precipitated in the form of oxides, hydroxides, etc.

For example, GB 1 340 045 discloses a batch process for coating the surface of titanium dioxide pigment, where the pigment, in the form of a suspension, is subjected to intensive stirring in an agitated vessel for up to two hours, during which time the coating substances are added and precipitated.

However, owing to the relatively large volume of the agitated tank and the limited possibilities for agitation, local concentration, pH, viscosity and temperature gradients occur during addition of the precursor compounds, these impairing the result of the coating of titanium dioxide particles. The resultant coating is of inconsistent density and/or inconsistent thickness.

Moreover, particle agglomeration can easily occur in the suspension, such that the deposited coating substances envelope not an individual particle, but frequently an agglomerate. The agglomerates are broken up again during subsequent dry milling, meaning that not all the particles in the end product are provided with a closed skin, but that the particles also display uncoated surface areas. In addition, part of the coating substances is not fixed on the particle surface, but forms flocs alongside the particles. These flocs can no longer be removed from the suspension and have a negative impact on the optical properties of the pigments, e.g. on the tinting strength (TS).

One advantage of the customary batch process in an agitated tank is that the dwell time is adapted to the reaction kinetics. In contrast, a disadvantage is that temperature profiles cannot be realized during the coating process without unreasonable effort.

An improvement of the known batch process for coating titanium dioxide in an agitated tank is the use of a cascade of agitated tanks. In this case, the precursor compounds of the inorganic oxides are each added in a separate, smaller agitated tank with improved possibilities for agitation.

U.S. Pat. No. 6,695,906 B2 describes a method of this kind, where $TiO_2$ pigment is coated with $SiO_2$ and $Al_2O_3$. The soluble $SiO_2$ component is added in three steps in three consecutive treatment vessels, in each of which a different pH value occurs. In this context, the $SiO_2$ component is added either directly to the treatment vessel, or inline to the feed line.

Nevertheless, local concentration, pH, viscosity and temperature gradients also occur in this case, leading to inconsistently dense and/or inconsistently thick coating of the titanium dioxide particles. The disadvantage likewise remains that temperature profiles are hard to realize.

A second improvement of the known batch process for coating titanium dioxide in an agitated tank is a continuous process in a tubular reactor. In this case, the precursor compounds of the inorganic oxides are each added to a tubular reactor with ideal possibilities for agitation (inline mixer or inline disperser). The precursor compounds are added at the molecular level, as it were, i.e. the precursor compounds to be reacted and the titanium dioxide particles to be coated are brought together in a very confined space and ideally mixed. This avoids local concentration, pH, viscosity and temperature gradients.

A method of this kind is disclosed in U.S. Pat. No. 5,993,533, for example, where titanium dioxide pigment is coated with $SiO_2$ and $Al_2O_3$ in two consecutive curing stages. The precursor compound is added to the $TiO_2$ slurry in an inline mixer. The slurry is subsequently fed into a tank and the coating substance is precipitated at 80 to 100° C. and pH values of >9.5 and <8.5, respectively.

US 2009/0297852 A1 likewise describes a continuous process for coating inorganic particles, where the precursor compounds are added to the slurry directly upstream of, or in, an inline disperser and the slurry is homogenized. The slurry is subsequently fed into a tank and the coating substance is precipitated.

DE10 2006 059 849 A1 discloses a coating method, where the precursor substances is added to the slurry directly upstream of, or in, an agitator mill and precipitation of the coating substance subsequently takes place in a tank.

The continuous process permits the realization of temperature profiles. However, it has the disadvantage that a dwell time adapted to the reaction kinetics can only be realized either by means of a possibly very long tube, avoiding the development of a laminar flow profile, or by means of a correspondingly large cure tank. Another disadvantage of the continuous process is that, if process control is not ideal, it is impossible to rule out the possibility of mixing of the individual inorganic oxides with the coating materials subsequently applied, this producing mixed-oxide layers instead of separate oxide layers.

BRIEF DESCRIPTION OF THE INVENTION

The object of the invention is to provide a method for coating inorganic particles that overcomes the disadvantages of the known methods, e.g. in that both homogenization of the suspension is ensured and the formation of agglomerates is largely suppressed.

The object is solved by a method for coating inorganic particles in an aqueous suspension with at least one coating substance, characterized in that the aqueous suspension is fed in a circuit and a vessel is present in the circuit, where the vessel is equipped with a high-speed agitator preferably displaying a peripheral speed of at least 15 m/s or a specific agitator capacity P/V of at least 30 W/m$^3$, and where a pipeline mixer based on the rotor/stator principle is furthermore installed in the circuit, and where a water-soluble precursor compound of the at least one coating substance is metered into the pipeline mixer.

BRIEF DESCRIPTION OF THE DRAWING

For a more complete understanding of the present invention and for further advantages thereof, reference is now made to the following description taken in conjunction with the accompanying drawings in which.

DESCRIPTION OF THE PREFERRED EMBODIMENT

Figure 1:
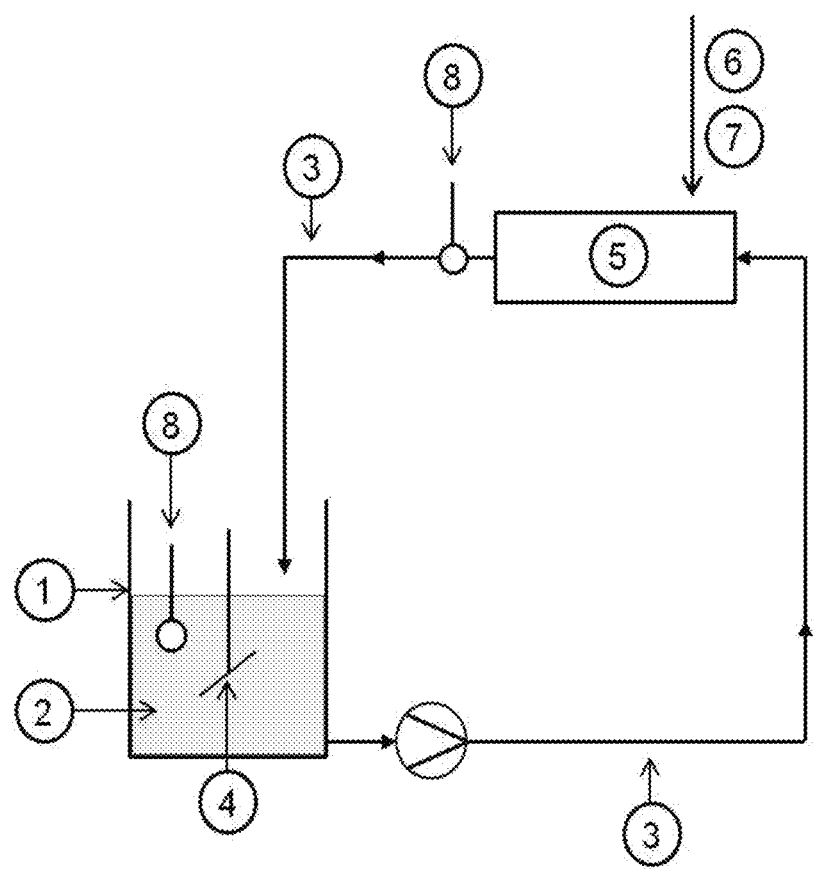
FIG. 1 is a flow chart of a preferred embodiment of the method according to the invention.

The present invention can be better understood by the following discussion of the manufacture and use of certain preferred embodiments. All data disclosed below regarding size, time, temperature, amount of components, concentration in % by weight, etc. are to be interpreted as also including all values lying in the range of the respective measuring accuracy known to the person skilled in the art. Unless otherwise stated, technical grades of the various materials were used in the preferred embodiments. The term "substantially free" is intended to connote that the particular material is not detected (i.e. is below the detection limit) using standard commercial tests and methodologies used in the industry as of the earliest priority date of this application.

The method according to the invention is based on an aqueous suspension of untreated, inorganic solid particles, which are also referred to as base material below. Suitable in this context are fine inorganic solids with a particle size in the region of roughly 0.001 μm to 1 mm, preferably 0.1 to 1 μm, that are processed in aqueous suspensions, such as pigments (titanium dioxide, color pigments, effect pigments, etc.), fillers, extenders, titanates, iron, nickel or other metallic particles.

Open to consideration as the coating are oxides, hydroxides, phosphates and similar compounds of the familiar elements Si, Ti, Al, Zr, Sn, Mn, Ce and other elements. Here and below, the term "oxide" is also to be taken to mean the respective hydroxide or hydrous oxide. In particular, the coatings involved are inorganic.

In a special embodiment of the invention, untreated titanium dioxide pigment particles (TiO$_2$ base material) are used. TiO$_2$ base material manufactured by either the sulfate process or the chloride process can be used. The TiO$_2$ base material can have an anatase or rutile structure. Rutile is preferred. The TiO$_2$ base material is customarily doped with familiar elements, such as Al, to improve the photostability of the TiO$_2$ pigment. In the chloride process, for example, such a quantity of AlCl$_3$ is oxidized together with TiCl$_4$ that the TiO$_2$ base material displays roughly 0.5 to 2.0% by weight Al, calculated as Al$_2$O$_3$. During titanium dioxide production by the sulfate process, the hydrolyzed titanyl sulfate is mixed with calcining additives, such as potassium hydroxide or phosphoric acid, and subsequently calcined. The TiO$_2$ base material from the sulfate process customarily contains roughly 0.2 to 0.3% by weight K and 0.05 to 0.4% by weight P, each calculated as the oxide.

The untreated particles, particularly TiO$_2$ base material, are made into an aqueous suspension. A dispersant is customarily added to the suspension. Suitable dispersants are known to the person skilled in the art. For example, sodium silicate or sodium hexametaphosphate is used with preference as the dispersant when disagglomerating TiO$_2$ base material in sand mills. The dispersant concentration is customarily in the region of 0.05 to 5.0 kg/mt TiO$_2$.

The pH value of the suspension is likewise customarily set as a function of the particle type and the dispersant. When disagglomerating TiO$_2$ base material from the chloride process, for example, the pH value is set to values of roughly 9 to 12, or to values of roughly 2 to 5. The temperature of TiO$_2$ base material suspensions is customarily roughly 40 to 80° C. Customarily, the suspension is subsequently disagglomerated, e.g. in agitator mills, such as bead mills or sand mills, or in ultrasonic mills.

A preferred embodiments of the method according to the invention for the surface-coating (post-treatment) of inorganic particles is illustrated schematically in FIG. 1. In this preferred embodiment, the disagglomerated, aqueous particle suspension (2) is fed (recirculated) from an intermediate vessel (vessel) (1) in a cyclic process (3). The intermediate vessel contains a high-speed agitator (4). The high-speed agitator has a minimum peripheral speed of 15 m/s or a specific agitator capacity P/V of at least 30 W/m$^3$, where P=agitator capacity and V=volume of the vessel. The high-speed agitator is, for example, based on the rotor/stator principle and is preferably a jet stream mixer. A jet stream mixer permits intensive mixing on the macro and micro scale. In addition, toothed-disc mixers or high-speed pitched-blade agitators are also suitable.

A pipeline mixer (e.g. inline dispersing mixer) (5) is furthermore installed in the circuit (3), it likewise being based on the rotor/stator principle. The water-soluble precursor compounds of the coating substances (6), and equally any necessary pH-controlling substances (7), are metered into the pipeline mixer (5). Local concentration, pH, viscosity and temperature gradients in the suspension are minimized in this way. In addition, pH sensors (8) are integrated in the circuit (3) and the vessel (1).

Sodium silicate or potassium silicate solution is customarily used as the water-soluble precursor compound for coating the particles with silicon dioxide. It is furthermore also possible to use organometallic compounds, such as alkoxysilanes, as precursor compounds for coating with SiO$_2$. Silicon dioxide can be precipitated onto the particle surface in the form of a porous coating or a dense skin.

According to the preferred embodiment of the invention, the particles can be coated with the quantities of silicon dioxide customarily used, e.g. with roughly 1 to 20% by weight SiO$_2$ for TiO$_2$ pigment particles.

Water-soluble aluminum salts, such as sodium aluminate, aluminum sulfate, aluminum chloride, etc., are customarily used as the precursor compound for coating with aluminum oxide. The person skilled in the art is familiar with such compounds, particularly from the extensive patent literature on the surface-coating (post-treatment) of titanium dioxide.

The particles can be coated with the quantities of aluminum oxide customarily used, e.g. with roughly 0.5 to 10% by weight $Al_2O_3$ for $TiO_2$ pigment particles.

Once the suspension has passed through the pipeline mixer (e.g. inline disperser), it is pumped through the intermediate vessel and recirculated in the circuit. Thanks to the improved mixing, the high shear forces introduced by the jet stream mixer in the intermediate vessel likewise help to minimize the local concentration, pH, viscosity and temperature gradients in the suspension.

Different conditions for precipitating the coating substance can be realized. For example, kinetically controlled precipitation of silicon dioxide from sodium silicate can be realized to form a dense skin. The pH-controlling substances are metered into the pipeline mixer (e.g. inline disperser) to this end, and $SiO_2$ precipitation takes place after a delay during the continuous input of shear energy in the cyclic process. Agglomeration of the $TiO_2$ particles during the adjustment of the pH value necessary for precipitation is minimized by the high, continuous input of shear energy.

In contrast, precipitation of $Al_2O_3$ at a fixed pH value, for example, takes place directly after addition of the pH-controlling substances and mixing in the pipeline mixer (e.g. inline disperser).

Use of the preferred method according to the invention additionally makes it possible to operate the coating process with a temperature profile. In this process, the intermediate vessel, for example, has a double jacket, via which the vessel can be heated with steam, or cooled with cooling water or via a heat exchanger. Where appropriate, the temperature of the feed line can also be controlled by means of a heat exchanger.

In a special embodiment of the invention, the dense $SiO_2$ skin is precipitated onto the particles at a temperature of roughly 85 to 95° C., preferably at roughly 90° C., and the subsequent $Al_2O_3$ layer at a temperature of roughly 45 to 55° C., preferably at roughly 50° C.

Following precipitation, the suspension is set to a pH value of roughly 5 to 7, pumped off, and the coated particles are separated from the suspension, washed if appropriate, dried and fine-milled by familiar methods. At the end of the procedure, the particles preferably display a pH value of less than 6.5.

The preferred method according to the invention particularly differs from the known methods from the prior art in that a high amount of shear energy is input, not only during addition of the precursor compound and homogenization of the slurry, but also during precipitation of the coating substance, because the slurry is continuously recirculated. This particularly relates to the precipitation of $SiO_2$ layers, whose form—dense or porous—is extensively determined by the reaction kinetics.

Compared to the known methods from the prior art, the preferred method according to the invention offers the following advantages:

Improved homogenization of the suspension is possible, owing to the increased shear energy input that can be realized by the high-speed agitator in the intermediate vessel and the pipeline mixer based on the rotor/stator principle (e.g. inline disperser) in the cyclic system. It is furthermore possible to minimize high viscosities that, under other circumstances, lead to thickening of the suspension and corresponding processing difficulties. The high input of shear energy can additionally lead to the disintegration of particle agglomerates that are also formed as a result of the pH profile in the course of the post-treatment process.

With the help of the cyclic operating mode according to the invention, it is possible to realize temperature profiles during post-treatment, e.g. in that the temperature is lowered within a short time during post-treatment. A fixed temperature throughout the process is not absolutely necessary.

Furthermore, two different precipitation zones can be realized. While kinetically controlled precipitation occurs after a delay following metering and mixing, precipitation at a constant pH value can take place immediately after metering in the dispersing head of the pipeline mixer (e.g. inline disperser).

The preferred method according to the invention makes it possible to build up separate, consecutively precipitated layers on the particle surface.

Above and beyond this, the use of two intermediate vessels, installed in parallel, makes it possible to realize an alternating operating mode (pendulum operation mode), this improving the formation of separate layers In an alternate embodiment of the invention, the solid particles in the suspension are disagglomerated prior to their introduction into the circuit by passing the suspension through a mill, e.g. an agitator mill such as bead mill and sand mill an ultrasonic mill. In this embodiment, the suspension is added to the circuit immediately prior to the pipeline mixer instead of to the vessel. The suspension then passes through the pipeline mixer where the water-soluble precursor compound of a coating substance is metered into the suspension as described above.

The subsequent steps of the method are analogous to those described above. Once the suspension has passed through the pipeline mixer (e.g. inline disperser), it is pumped through the intermediate vessel and recirculated in the circuit. Precipitation of the coating substance is likewise realized by metering pH controlling substances into the pipeline mixer. Finally, the suspension is set to a pH value of roughly 5 to 7, pumped off, and the coated particles are separated from the suspension, washed if appropriate, dried and fine-milled by familiar methods An additional advantage of this alternate embodiment of the invention is that the need for a dispersing agent can be avoided.

EXAMPLES

The invention is explained in more detail below on the basis of examples, although these are not to be interpreted as a limitation of the invention. The quantities indicated refer to the $TiO_2$ base material in each case.

Example 1

224 liters of a suspension of titanium dioxide base material from the chloride process with a solids content of 450 g/l were put into an intermediate vessel (1) with high-speed agitator (4). The suspension was pumped round the circuit (3), through the inline disperser (5) and the vessel (1), at a rate of 500 l/h for 40 min. The suspension was heated to 90° C. during the cyclic process, and the pH value set to 10 by adding NaOH (7).

2.0% by weight $SiO_2$ in the form of sodium silicate solution (corresponding to 17.7 liters with an active substance concentration of 115 g/l) was subsequently added (6) within 20 min. Pumping was subsequently continued for a further 20 min., during which time the $SiO_2$ skin formed on the particle surface.

To lower the pH value, 0.2% by weight $TiO_2$ in the form of titanyl chloride solution (corresponding to 1.5 liters with an active substance concentration of 140 g/l) was subsequently added (7), followed by 30% HCl, in such a way that a pH value of 7.5 was achieved after 100 min. and a pH value of 4 after 120 min.

The suspension was subsequently cooled to 50° C. within approx. 20 min. 3.0% by weight $Al_2O_3$ in the form of sodium aluminate solution (corresponding to 10.4 liters with an active substance concentration of 293 g/l) was subsequently added (6) within 30 min., during simultaneous addition (7) of 30% HCl, in such a way that the pH value remained constant at roughly 4.

Finally, the pH value was set to a value in the range from 5 to 8 by adding 0.2% by weight $Al_2O_3$ in the form of sodium aluminate solution, as well as NaOH.

The suspension was pumped off, filtered, washed, dried and milled in a microniser.

Reference Example 1a

The procedure of Example 1 was repeated, but with the difference that there was no recirculation and that the water-soluble precursor compounds were added directly to the intermediate vessel (1).

Reference Example 1b

Same as Reference Example 1a, but with the difference that a propeller mixer was installed in the intermediate vessel (1), instead of the jet stream mixer.

Figure 2:
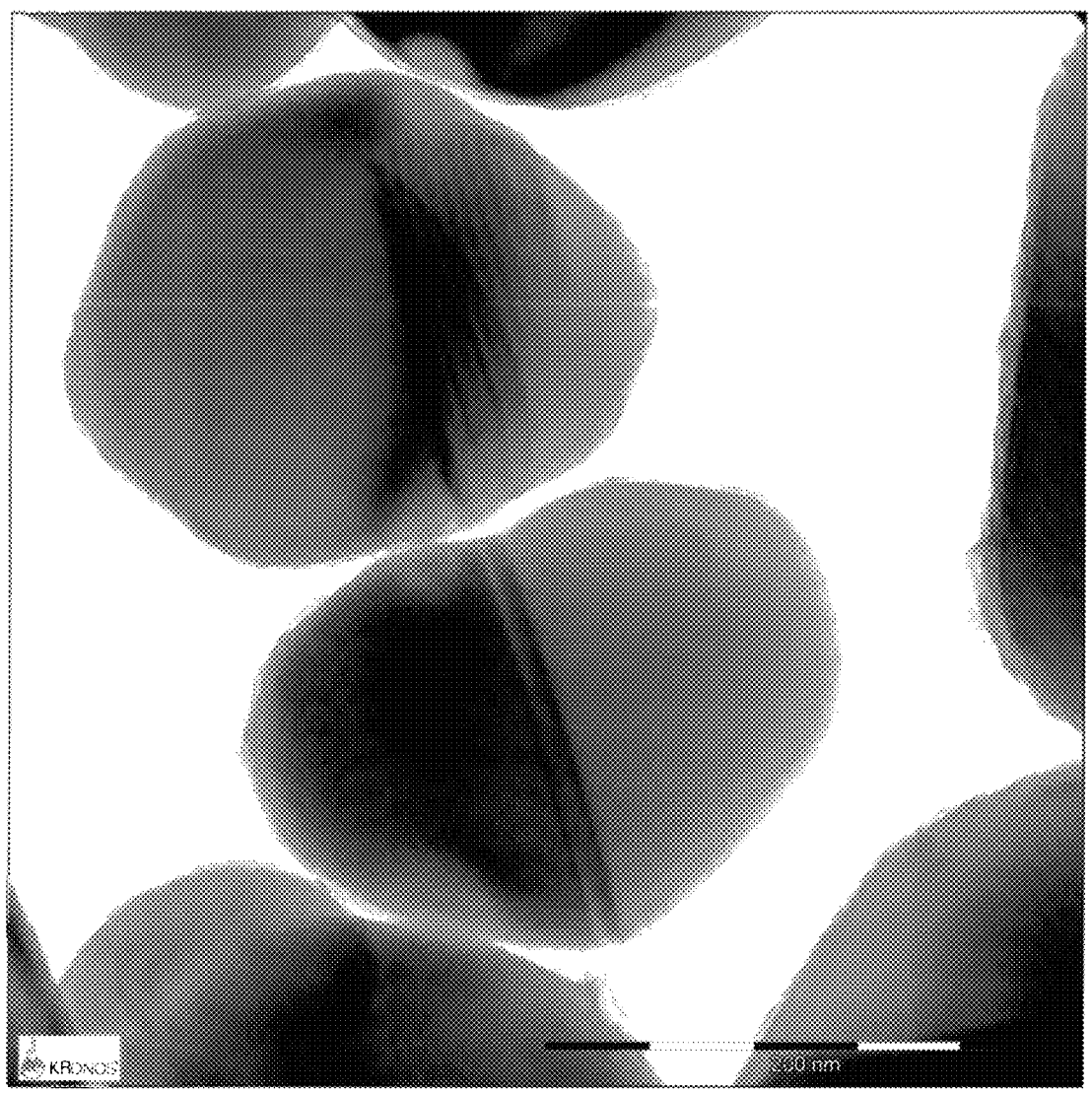
FIG. 2 is a transmission electron microscope image of the pigment according to Example 1.

The $TiO_2$ pigments obtained were examined under the transmission electron microscope (FIG. 2), and the specific surface area (BET), sulphuric-acid solubility and gloss (HMG) were tested (Table 1).

TABLE 1

|  | BET | Sulphuric-acid solubility | Gloss (HMG) |
| --- | --- | --- | --- |
| Example 1 | 9.0 m$^2$/g | 10.0% by weight | 76 |
| Reference Example 1a | 9.5 m$^2$/g | 16.2% by weight | 74 |
| Reference Example 1b | 10.0 m$^2$/g | 16.0% by weight | 72 |

Example 2

Same as Example 1, but with the difference that 2.8% by weight $SiO_2$, instead of 2.0% by weight, and 2.3% by weight $Al_2O_3$, instead of 3.0% by weight, were added in the form of the corresponding precursor compounds.

Reference Example 2

Same as Example 2, but with the difference that there was no recirculation, that the water-soluble precursor compounds were added directly to the intermediate vessel (1), and that a propeller mixer was installed in the intermediate vessel (1), instead of the jet stream mixer.

The $TiO_2$ pigments obtained were examined under the transmission electron microscope, and the specific surface area (BET) and sulphuric-acid solubility were tested (Table 2).

TABLE 2

|  | BET | Sulphuric-acid solubility |
| --- | --- | --- |
| Example 2 | 9.4 m$^2$/g | 5.9% by weight |
| Reference Example 2 | 11.1 m$^2$/g | 8.2% by weight |

Example 3

Same as Example 2, but with the difference that the process was implemented at a consistent temperature of 80° C.

Reference Example 3

Same as Example 3, but with the difference that there was no recirculation, that the water-soluble precursor compounds were added directly to the intermediate vessel (1), and that a propeller mixer was installed in the intermediate vessel (1), instead of the jet stream mixer.

Figure 3:
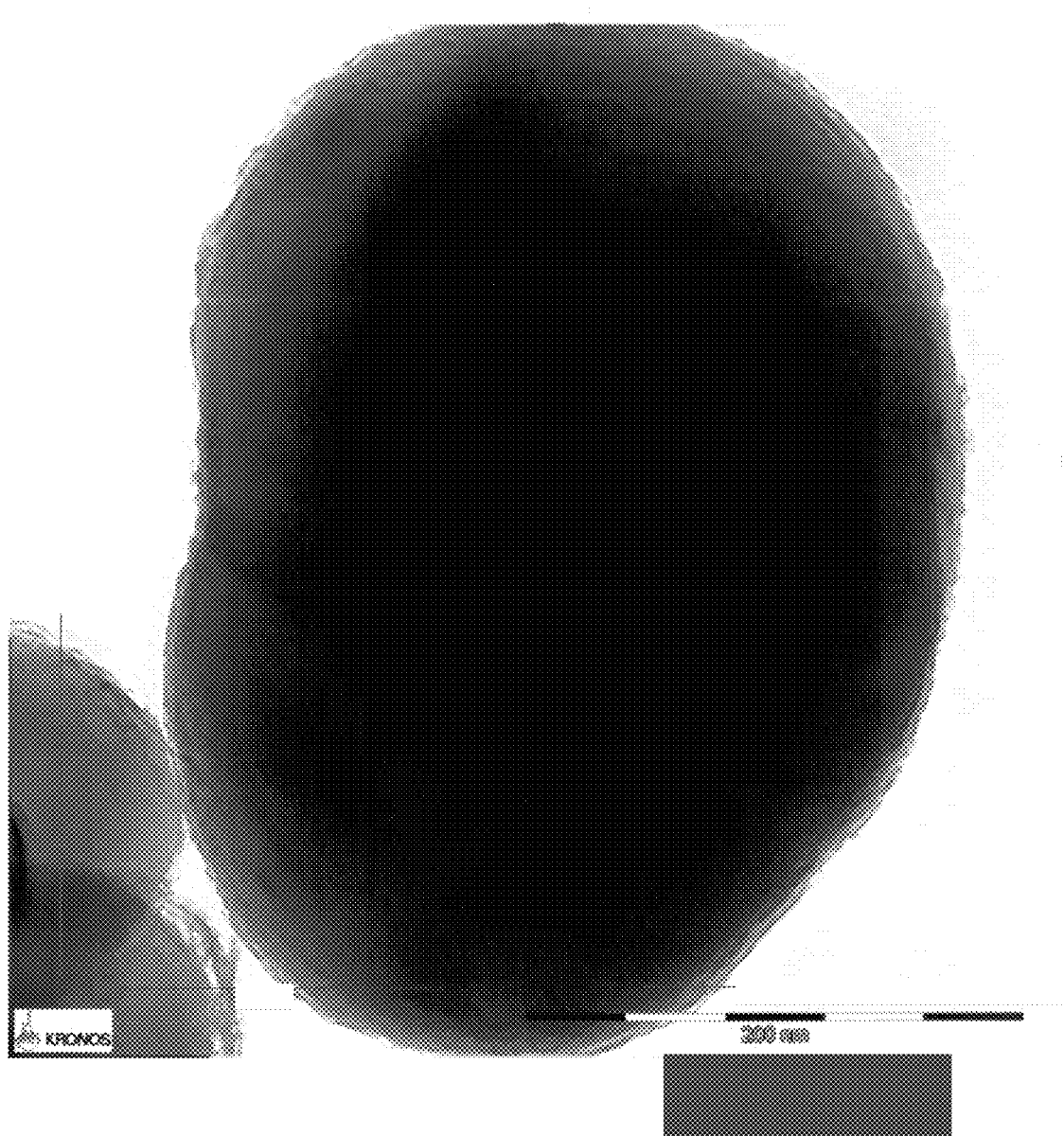
FIG. 3 is a transmission electron microscope image of the pigment according to Example 3.
Figure 4:
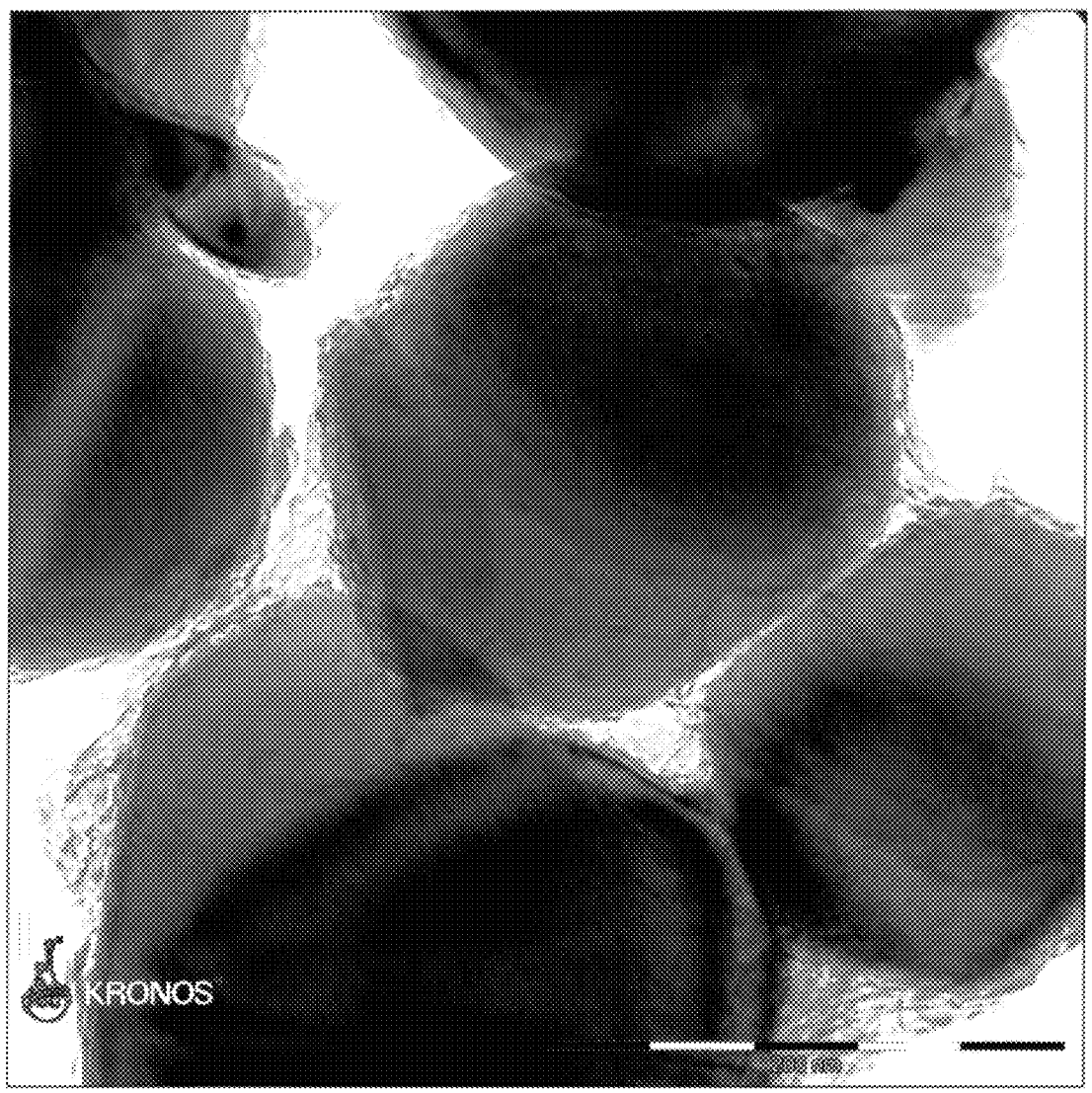
FIG. 4 is a transmission electron microscope image of the pigment according to Reference Example 3.

The $TiO_2$ pigments obtained were examined under the transmission electron microscope (Example 3=FIG. 3; Reference Example 3=FIG. 4), and the specific surface area (BET) and sulphuric-acid solubility were tested (Table 3).

TABLE 3

|  | BET | Sulphuric-acid solubility |
| --- | --- | --- |
| Example 3 | 12.2 m$^2$/g | 8.2% by weight |
| Reference Example 3 | 15.1 m$^2$/g | 12.6% by weight |

Test Methods

Specific surface area according to BET (Brunauer, Emmett, Teller):

The BET surface is measured with a Tristar 3000 from Messrs. Micromeritics in accordance with the static volumetric principle.

Sulphuric-Acid Solubility:

A suspension of 500 mg pigment in 25 ml concentrated sulfuric acid (96% by weight) is kept at 175° C. for 60 min. Following filtration, the dissolved $TiO_2$ in the filtrate is determined by means of ICP atomic emission spectrometry. The lower the concentration of dissolved $TiO_2$, the more dense the $SiO_2$ skin on the pigment surface.

Gloss (HMG):

The pigment is dispersed in Alkydal F26 X 60% from Bayer in an automatic muller. A sample of the suspension with a PVC of 27% is applied to a glass plate with a film applicator. After the drawdown has dried, the gloss (20°) is measured with a haze-gloss reflectometer.

The coating of the titanium dioxide particles can be visualized with the help of transmission electron microscopy (TEM).

Compared to methods of the prior art, the preferred method according to the invention leads to surface coatings with greater smoothness (low specific surface area according to BET) and improved density (low sulfuric-acid solubility). In addition, less coating substance is precipitated separately (improved gloss).

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for coating titanium dioxide particles in an aqueous suspension with at least one coating substance, comprising:

providing a circuit containing a vessel in fluid communication with a pipeline mixer;
wherein the vessel is equipped with a high-speed agitator displaying a peripheral speed of at least 15 m/s or a specific agitator capacity of at least 30 W/m$^3$;
wherein the pipeline mixer is based on the rotor/stator principle;
metering a water-soluble precursor compound of the at least one coating substance into the suspension solely in the pipeline mixer; and
circulating the aqueous suspension of titanium dioxide particles through the pipeline mixer and to the vessel more than once.

2. The method of claim 1, wherein the at least one coating substance includes at least one coating selected from the group consisting of silicon dioxide and aluminum oxide.

3. The method of claim 2, wherein the at least one coating substance includes silicon dioxide and the suspension is maintained at a temperature of about 85 to about 95° C. during precipitation of silicon dioxide onto the particles.

4. The method of claim 2, wherein the at least one coating substance includes aluminum oxide and the suspension is maintained at a temperature of about 45 to about 55° C. during precipitation of aluminum oxide onto the particles.

5. The method of claim 2, wherein a sufficient amount of a water soluble precursor compound of silicon dioxide is metered into the pipeline mixer to form a dense skin on the particles.

6. The method of claim 1, further comprising maintaining the temperature of the suspension in a desired range by heating or cooling the vessel.

7. The method of claim 1, wherein the coated, inorganic particles display a pH value of less than about 6.5 at the end of the process.

8. The method of claim 1, further comprising metering pH-controlling substances into the suspension via the pipeline mixer.

9. The method of claim 8, wherein titanyl chloride is used as the pH-controlling substance.

10. The method of claim 8, wherein the at least one coating substance includes at least one coating selected from the group consisting of silicon dioxide and aluminum oxide.

11. The method of claim 10, wherein the at least one coating substance includes silicon dioxide and the suspension is maintained at a temperature of about 85 to about 95° C. during precipitation of silicon dioxide onto the particles.

12. The method of claim 10, wherein the at least one coating substance includes aluminum oxide and the suspension in the pipeline mixer is maintained at a temperature of about 45 to about 55° C. during precipitation of aluminum oxide onto the particles.

13. The method of claim 10, wherein a sufficient amount of a water soluble precursor compound of silicon dioxide is metered into the pipeline mixer to form a dense skin on the particles.

14. The method of claim 8, further comprising maintaining the temperature of the suspension in the vessel in a desired range using heating or cooling.

15. The method of claim 1 wherein the aqueous suspension is added to the circuit at the vessel.

16. The method of claim 1 wherein the aqueous suspension is added to the circuit at the pipeline mixer.

17. The method of claim 16 wherein the inorganic solid particles are first deagglomerated by passing the aqueous suspension through a mill prior to its addition to the circuit.

18. The method of claim 17 wherein no dispersing aid is added to the suspension.

19. A method for coating titanium dioxide particles in an aqueous suspension with at least one coating substance, comprising:
providing a circuit containing a vessel in fluid communication with a pipeline mixer;
wherein the vessel is equipped with a high-speed agitator displaying a peripheral speed of at least 15 m/s or a specific agitator capacity of at least 30 W/m$^3$;
wherein the pipeline mixer is based on the rotor/stator principle;
circulating the aqueous suspension of particles through the pipeline mixer and to the vessel more than once; and
metering a water-soluble precursor compound of the at least one coating substance and at least one pH-controlling substance into the suspension solely in the pipeline mixer.

20. The method of claim 19, wherein the at least one coating substance includes at least one coating selected from the group consisting of silicon dioxide and aluminum oxide.

21. The method of claim 20, wherein the at least one coating substance includes silicon dioxide and the suspension is maintained at a temperature of about 85 to about 95° C. during precipitation of silicon dioxide onto the particles.

22. The method of claim 20, wherein the at least one coating substance includes aluminum oxide and the suspension is maintained at a temperature of about 45 to about 55° C. during precipitation of aluminum oxide onto the particles.

23. The method of claim 20, wherein a sufficient amount of a water soluble precursor compound of silicon dioxide is metered into the pipeline mixer to form a dense skin on the particles.

24. The method of claim 19, further comprising maintaining the temperature of the suspension in a desired range by heating or cooling the vessel.

25. The method of claim 19, wherein the coated, inorganic particles display a pH value of less than about 6.5 at the end of the process.

26. The method of claim 19, wherein titanyl chloride is used as the pH-controlling substance.

27. The method of claim 19, further comprising recirculating the aqueous suspension through the circuit following the application of the at least one coating and metering a water-soluble precursor compound of a second coating substance into the suspension in the pipeline mixer.

28. The method of claim 19 wherein the aqueous suspension is added to the circuit at the vessel.

29. The method of claim 19 wherein the aqueous suspension is added to the circuit at the pipeline mixer.

30. The method of claim 29 wherein the inorganic solid particles are first deagglomerated by passing the aqueous suspension through a mill prior to its addition to the circuit.

31. The method of claim 29 wherein no dispersing aid is added to the suspension.

* * * * *